US006727477B1

(12) United States Patent
Li-Chen

(10) Patent No.: US 6,727,477 B1
(45) Date of Patent: Apr. 27, 2004

(54) TEMPERATURE CONTROLLER

(75) Inventor: Wu Chang Li-Chen, Pa-Te (TW)

(73) Assignee: Lyu Jan Co., Ltd., Pa-Te (TW)

( * ) Notice: Subject to any disclaimer, the term of this patent is extended or adjusted under 35 U.S.C. 154(b) by 0 days.

(21) Appl. No.: 10/402,738

(22) Filed: Mar. 28, 2003

(51) Int. Cl.⁷ .................................... H05B 1/02
(52) U.S. Cl. .............. 219/494; 219/481; 219/491; 219/490; 439/38; 439/39
(58) Field of Search ................... 219/490–494, 219/507, 508, 481, 501; 439/38–40, 310, 311, 352, 374, 954, 680; 99/327–338, 403–417

(56) References Cited

U.S. PATENT DOCUMENTS 3,363,214 A * 1/1968 Wright .................. 339/12
5,873,737 A * 2/1999 Hashizawa et al. ........... 439/39
6,267,602 B1 * 7/2001 Mendelson et al. .......... 439/39
6,536,333 B2 * 3/2003 Bouly et al. .................. 99/403

* cited by examiner

Primary Examiner—Mark H. Paschall
(74) Attorney, Agent, or Firm—Bacon & Thomas, PLLC

(57) ABSTRACT

A temperature controller includes temperature-adjusting device and a heating device. A plurality of magnet pieces and magnet attractive pads are respectively provided to terminal faces of the temperature-adjusting device and the heating device respectively for inducing magnetic attraction between the temperature-adjusting device and the heating device for enhancing the mounting force therebetween.

1 Claim, 4 Drawing Sheets

TEMPERATURE CONTROLLER

BACKGROUND OF THE INVENTION

1. Field of the Invention

This invention relates to a temperature controller comprising a temperature-adjusting device and a heating device releasably attached to each other, in particular to a temperature controller comprising magnetic means for releasably attaching/detaching the temperature-adjusting device to/from the heating device.

2. The Prior Arts

A temperature controller comprised of a temperature-sensing device and an output-power adjusting device is often employed in an electrical heating device, such as a tempura pot, a frying pan, and a chafing dish. FIG. 1 of the attached drawings shows a conventional temperature controller composed of a detachable temperature-adjusting device A as well as a heating device B. Through an extended temperature-sensing rod A1 and two conductive rings A2 of the temperature-adjusting device A, together with an associated temperature-sensing hole B1 and two conductive levers B2 defined on a terminal face of the heating device B, the temperature-adjusting device A and the heating device B cooperatively realize temperature detection, electrical connection, and hence heating operation.

For securely fixing the temperature-adjusting device A and the heating device B, an elastic clamp A3 is disposed in each conductive ring A2 for clenching each conductive lever B2 so as to fixedly connect the temperature-adjusting device A and the heating device B together.

In the conventional temperature controller, the temperature-adjusting device and the heating device are combined by means of the elastic clamp arranged in each conductive ring. However, such an arrangement requires a great force to combine or separate those two components, which could be impaired by an improper force application.

SUMMARY OF THE INVENTION

A primary object of this invention is to provide a temperature controller comprising a heating device and a temperature-adjusting device releasably mounted together by means of magnetic force so as to protect the devices from being damaged due to excessive insertion and separation forces.

In order to realize the above object, a temperature controller in accordance with the invention comprises a temperature-adjusting device having a temperature-sensing portion and an output-power adjusting portion and a heating device having an electric heating element. The output-power adjusting portion of the temperature-adjusting device forms two conductive rings and a plurality of magnet pieces located outside the conductive rings. A plurality of magnet attractive pads is formed on a terminal face of the heating device at positions corresponding to the magnet pieces to induce magnetic attraction between the temperature-adjusting device and the heating device for enhancing the mounting force therebetween. The merits of the temperature controller of the present invention are as follows:

1. The force that secures the temperature-adjusting device and the heating device together is enhanced by the magnetic attraction induced by the magnet pieces and the corresponding magnet attractive pads.
2. Owing to the magnetic attraction, the elastic clamp that is employed in the conventional design can be omitted and the fabrication process is simplified.
3. Because of the enhanced mounting force between the temperature-adjusting device and the heating device, the temperature controller is protected from being damaged by excessive insertion and separation force.

For more detailed information regarding advantages or features of this invention, at least an example of preferred embodiment will be described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE PREFERRED EMBODIMENT

Figure 1:
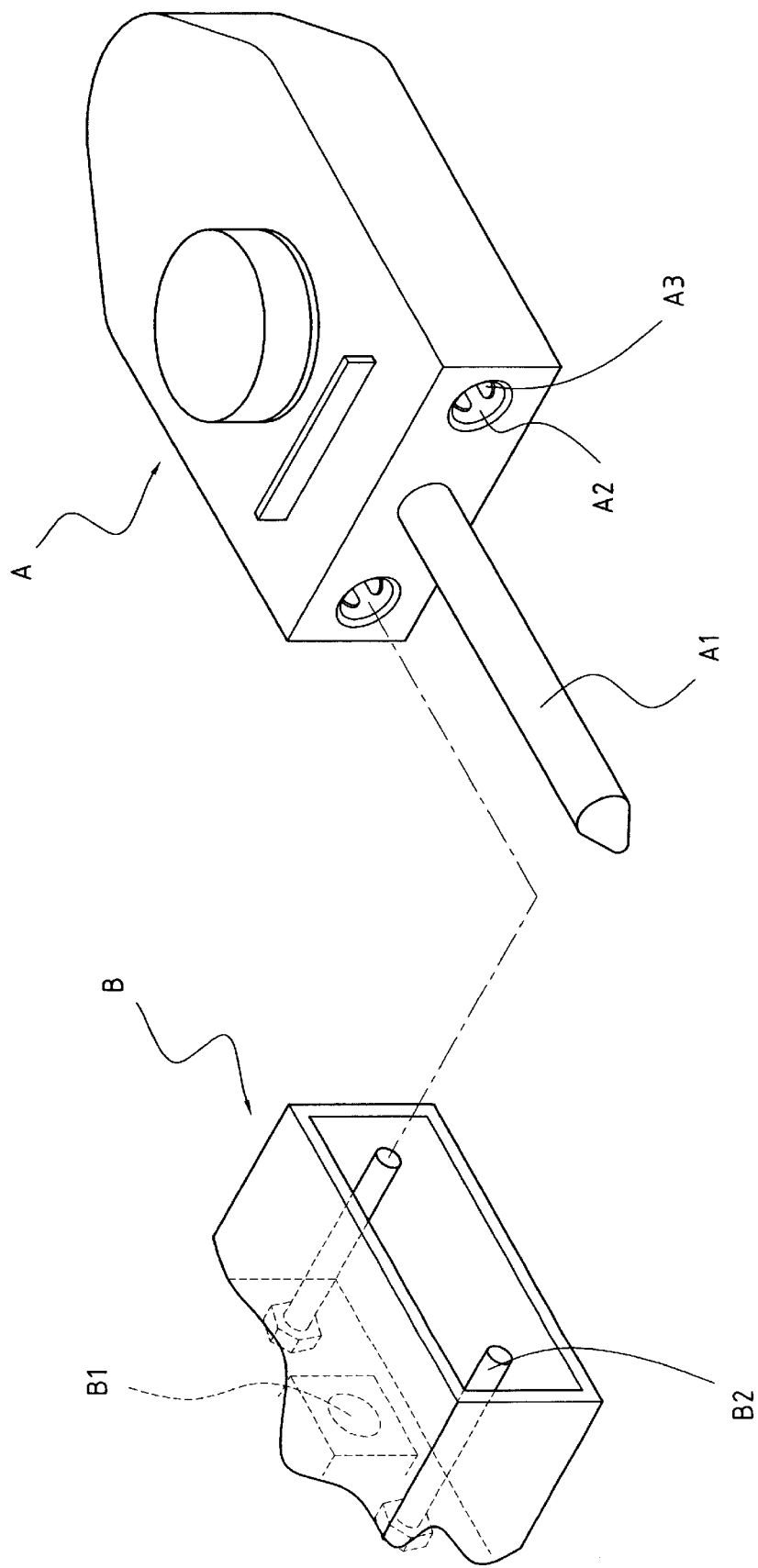
FIG. 1 is a perspective view of a conventional temperature controller.
Figure 2:
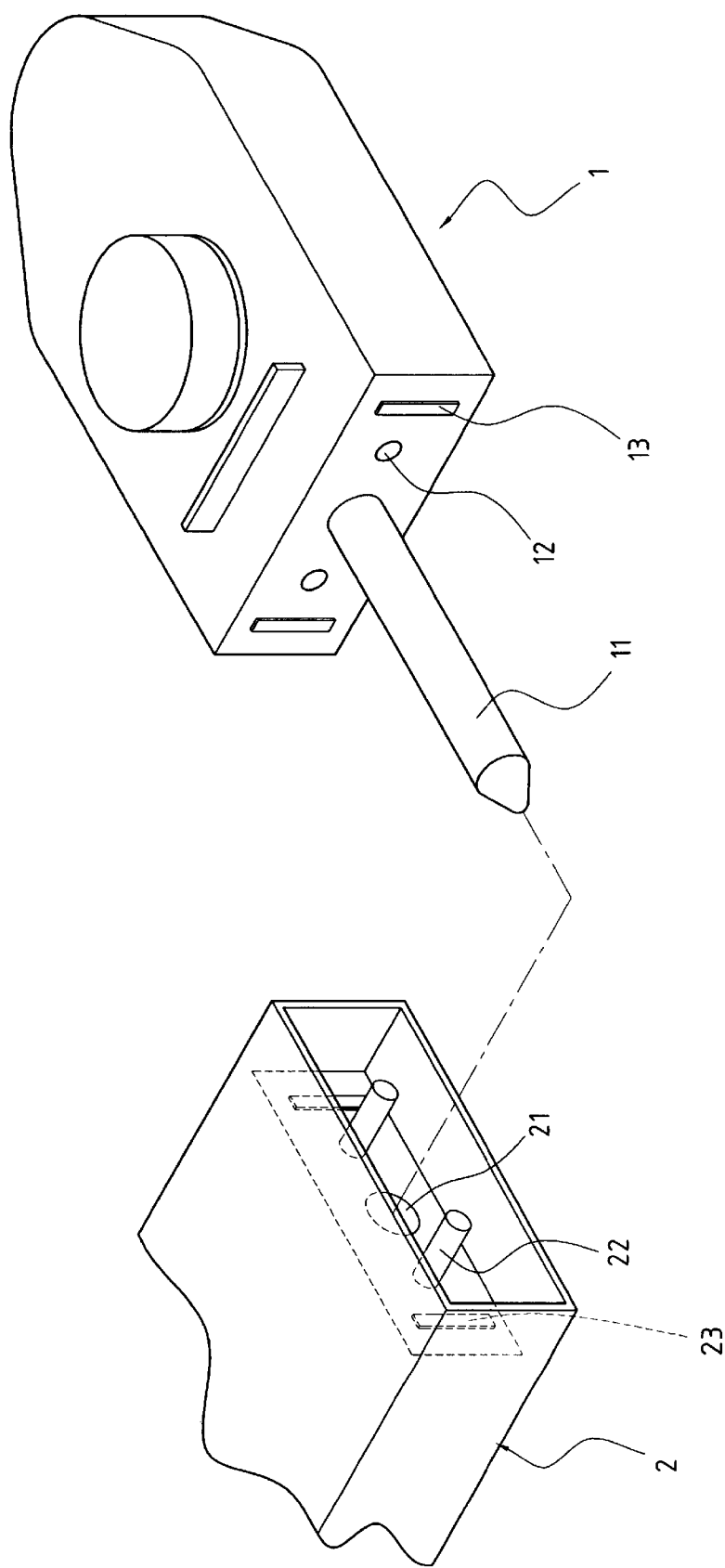
FIG. 2 is a perspective view of a temperature controller constructed in accordance with the present invention.
Figure 3:
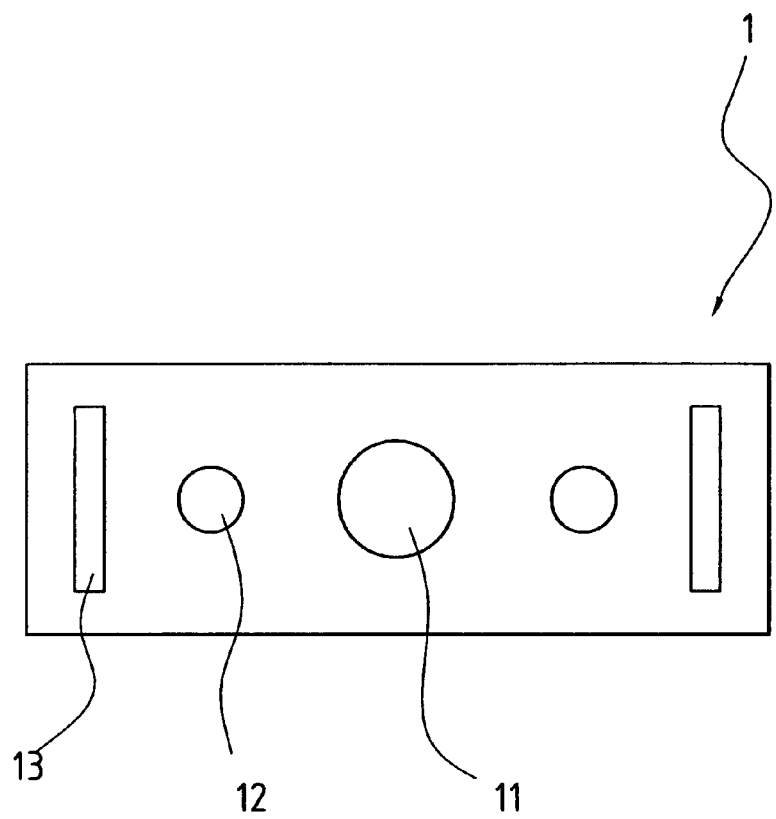
FIG. 3 is a front view of a temperature-adjusting device of the temperature controller of the present invention.
Figure 4:
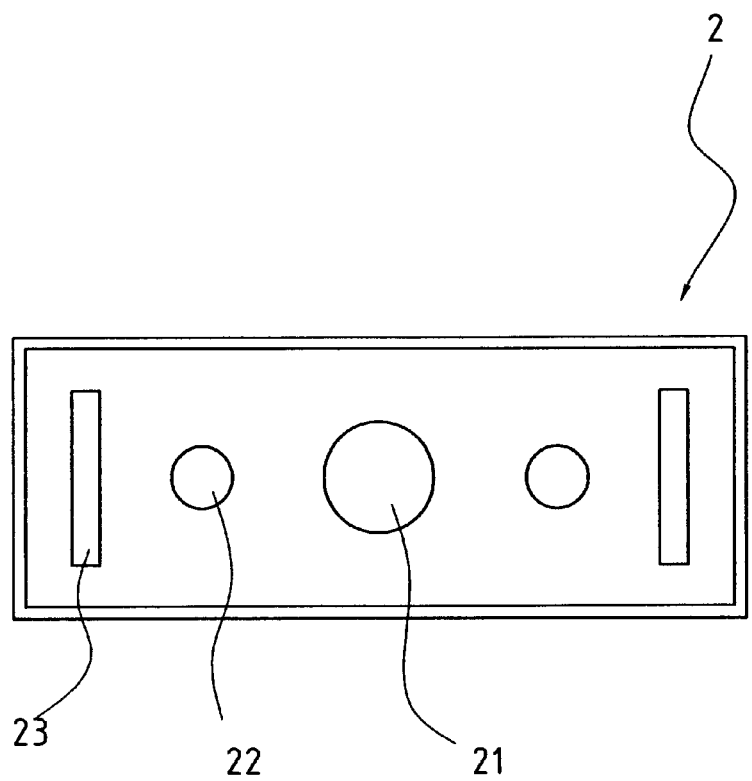
FIG. 4 is a front view of a heating device of the temperature controller of the present invention.

With reference to the drawings and in particular to FIGS. 2–4, a temperature controller constructed in accordance with the present invention comprises a temperature-adjusting device 1 and a heating device 2.

The temperature-adjusting device 1 comprises a temperature-sensing portion and an output-power adjusting portion. A metallic temperature-sensing rod 11 and two conductive rings 12 are respectively formed on the temperature-sensing portion and the output-power adjusting portion. A plurality of magnet pieces 13 is arranged on a common terminal face of the temperature-sensing portion and the output-power adjusting portion.

The conductive rings 12 are disposed respectively in holes (not labeled) defined in the terminal face on opposite sides of the temperature-sensing rod 11. The magnet pieces 13 are located respectively outside the conductive rings 12.

At one end of the heating device 2, a temperature-sensing hole 21, two conductive levers 22 and two magnet-attractive pads 23 are disposed. The temperature-sensing hole 21 receives the temperature-sensing rod 11 therein to allow the temperature-sensing rod 11 to detect temperature of the heating device 2. The conductive pins 22 are formed by extending an electric heating element in the heating device 2 laterally nearby the temperature-sensing hole 21 for insertion into the respective conductive ring 12 for establishing electrical connection between and transmission of electrical power therethrough. The magnet attractive pads 23 are disposed on respective outer sides of the conductive pins 22 at positions corresponding to that of the magnet pieces 13 to induce magnetic attraction between the heating device 2 and the temperature-adjusting device 1.

when combining the temperature-adjusting device 1 with the heating device 2 to form the temperature controller of the present invention, the temperature-sensing rod 11 is first put into the temperature-sensing hole 21, then the magnet pieces 13 are brought to approach the magnet attractive pads 23 in a face to face manner to finally contact with each other as soon as the conductive levers 22 are plugged into the conductive rings 12.

A user only has to grasp the temperature controller at its two ends and pull it laterally and outwardly with hands so that the magnet pieces 13 and the magnet attractive pads 23, also the conductive levers 22 and the conductive rings 12 are separated from each other to have the temperature-adjusting device 1 and the heating device 2 detached from each other.

in the above described, at least one preferred embodiment has been described in detail with reference to the drawings annexed, and it is apparent that numerous changes or modifications may be made without departing from the true spirit and scope thereof, as set forth in the claims below.

What is claimed is:

1. A temperature controller comprising:

a temperature-adjusting device having a temperature-sensing portion and an output-power adjusting portion; and a heating device comprising an electric heating element connected to two conductive pins;

wherein the output-power adjusting portion of the temperature-adjusting device includes two conductive rings for receiving said two conductive pins for electrically connecting said electric heating element to said output-power adjusting portion and thereby supply electric power to said heating element, and a plurality of magnet pieces; and wherein a plurality of magnet attractive pads are formed on the heating device at positions corresponding to the magnet pieces for inducing magnetic attraction between the temperature-adjusting device and the heating device when the two conductive pins of the heating device are electrically connected to the two conductive rings of the temperature-adjusting device.

* * * * *